United States Patent
Baumann et al.

(10) Patent No.: US 6,510,883 B2
(45) Date of Patent: Jan. 28, 2003

(54) PNEUMATIC VEHICLE TIRE INCLUDING RUBBER REINFORCING PLIES IN SIDE WALL REGIONS

(75) Inventors: Karlheinz Baumann, Gelnhausen (DE); Günter Dietrich, Frankfurt (DE)

(73) Assignee: Dunlop GmbH, Hanau (DE)

( * ) Notice: Subject to any disclaimer, the term of this patent is extended or adjusted under 35 U.S.C. 154(b) by 0 days.

(21) Appl. No.: 09/834,262

(22) Filed: Apr. 12, 2001

(65) Prior Publication Data

US 2002/0003017 A1 Jan. 10, 2002

Related U.S. Application Data

(63) Continuation of application No. PCT/EP99/07630, filed on Oct. 12, 1999.

(30) Foreign Application Priority Data

Oct. 12, 1998 (DE) .......................... 198 46 854

(51) Int. Cl.⁷ .......................... B60C 3/00; B60C 15/00; B60C 15/06; B60C 17/00
(52) U.S. Cl. ...................... 152/454; 152/517; 152/539; 152/542; 152/546; 152/547; 152/553
(58) Field of Search ................................ 152/517, 553, 152/542, 543, 539, 532, 547, 546, 454

(56) References Cited

U.S. PATENT DOCUMENTS 5,368,082 A  11/1994  Oare et al.

FOREIGN PATENT DOCUMENTS

| EP | 0 542 252 A1 | 5/1993 |
| EP | 0 590 482 A1 | 4/1994 |
| EP | 0 822 105 A2 | 2/1998 |
| JP | 11170826 A  * | 6/1999 | .................. 152/517 |

OTHER PUBLICATIONS

PCT Search Report for Appln. No. PCT/EP 99/07630 date Feb. 4, 2000.

* cited by examiner

Primary Examiner—Adrienne C. Johnstone
(74) Attorney, Agent, or Firm—Fitch, Even, Tabin & Flannery

(57) ABSTRACT

The invention relates to pneumatic tires for a motor vehicle comprising a multi-layer carcass. Said multi-layer carcass extends between two bead rings, a set of bracing plies provided between the layers of the carcass and a tire tread, and rubber reinforcement layers arranged in the side wall areas which support the tire when it is deflated. The invention is characterized in that a first rubber reinforcement layer is arranged radially within a first carcass layer and a second rubber reinforcement layer is arranged between the first carcass layer and a second carcass layer. The two rubber reinforcement layers extend from the bead filler area to a position under the edge area of the bracing plies. The two rubber layers vary in thickness across the height of the side walls.

11 Claims, 1 Drawing Sheet

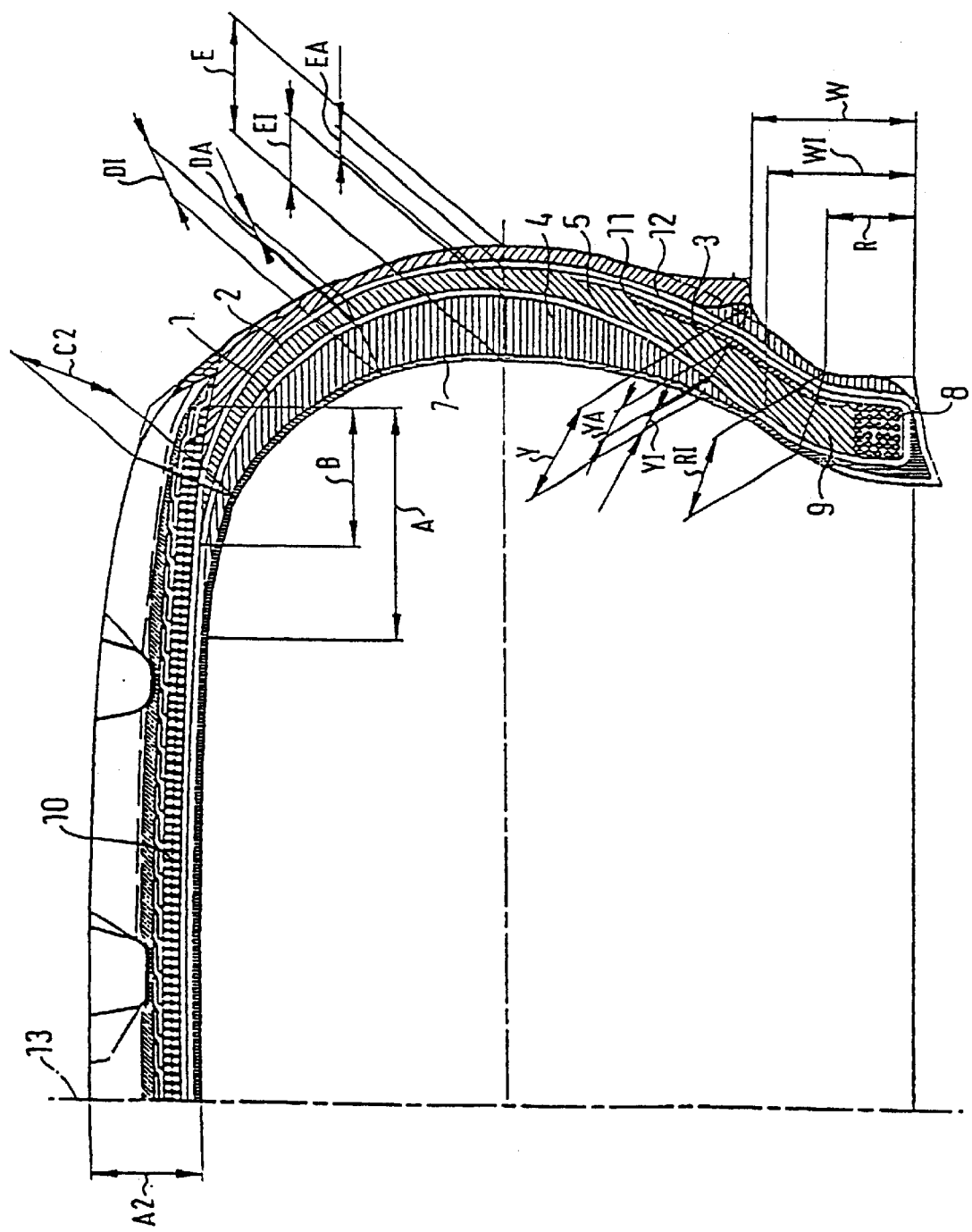

PNEUMATIC VEHICLE TIRE INCLUDING RUBBER REINFORCING PLIES IN SIDE WALL REGIONS

This is a continuation division, continuation-in-part, of prior application Ser. No. PCT/EP99/07630, filed Oct. 12, 1999 and designating the United States, which is hereby incorporated herein by reference in its entirety The invention relates to pneumatic vehicle tires comprising a multi-ply carcass, which extends between two bead rings having associated bead apexes, a belt arrangement provided between the carcass plies and a tread strip and also rubber reinforcing plies arranged in the side wall regions, which take on a supporting function with a deflated tire.

BACKGROUND

Vehicle tires of this kind are known, for example, from U.S. Pat. No. 5,368,082. It is possible by means of such tires to also cover even fairly long distances at a suitable speed with a deflated tire in the event of a flat, before the tire has to be repaired or changed. Such tires accordingly increase safety in the event of a flat and allow the next repair workshop to be reached without problem so that unwanted tire changes, which can also be dangerous on very busy roads, can be avoided.

SUMMARY

It is the object of the present invention to design a pneumatic vehicle tire of the kind initially mentioned such that a high mileage at a sufficiently high speed is also made possible in the deflated state, that the stiffening rubber layers provided in the side walls do not irritatingly impair the driving comfort of the tire operated at normal pressure and that the tire weight remains as low as possible.

This object is essentially satisfied in accordance with the invention by a first rubber reinforcing ply being arranged radially within a first carcass ply and a second rubber reinforcing ply being arranged between the first carcass ply and a second carcass ply, by mutually displaced ends of the two rubber reinforcing plies (4, 5) extending, starting from the bead apex region, up to and beneath the edge region of the belt ply, and by the two rubber plies having in particular a different height in the radial direction and pronouncedly different thicknesses over the height of the side wall.

Both rubber reinforcing plies and any bead apex provided and/or a bead apex region formed of one rubber reinforcing ply preferably consist of the same rubber mixture.

Optimum values are achieved with regard to the long-term running properties of deflated tires on the basis of the selection of the rubber mixture, the thickness profile of the rubber reinforcing plies and the respective curing times of these rubber reinforcing plies, which differ in dependence on the position of the rubber reinforcing plies in the tires, in particular when the modulus of elasticity (E*) of the rubber reinforcing plies and also of the bead apex are the same as or greater than 9 MPa when measured at 70° C. and the tanδ is the same as or smaller than 0.03 (measured by means of "EPLEXOR", 10 Hz, 10% prestress and 1% DSA). The hardness IRHD of these rubber reinforcing plies and of the bead apex should be the same as or greater than 80 when measured at room temperature. The measurement of the IRDH (international rubber hardness degree) is made analog to the Shore hardness measurement, but with a spherical measuring tip. The measurement or test is carried out in accordance with DIN 53519, whereby the so-called micro-hardness is determined, since small samples are measured which are taken from the respective tire.

The rubber reinforcing plies and the bead apexes or the bead apex regions integrally formed with a rubber reinforcing ply are preferably made of a rubber mixture which consists of a polymer mix of natural rubber (NR)/ isoprene rubber (IR) and butadiene rubber (BR), with at least 50 parts by weight per 100 parts by weight of rubber (phr) NR/IR being contained in this polymer mix, a carbon black content of 50 to 60 phr, preferably of fast sprayable FEF carbon black, and of 5 to 8 phr zinc oxide, 2 phr stearic acid, 1.5 phr of aging protection agent and one or more phr of vulcanization accelerator and sulfur (preferably 4 to 5 phr) in order to keep the loss properties of the mixture low.

In the event that the radially inner end of the outer rubber reinforcing ply is simultaneously formed as the bead apex, it is provided that when measured in the region of the maximum bead thickness (side wall height W), the thickness of the inner rubber reinforcing ply amounts to approximately 4.4 mm and the thickness of the outer rubber reinforcing ply amounts to approximately 8.7 mm, with a tolerance of ±0.5 mm applying to all measured values.

Further advantageous embodiments of the invention are given in the dependent claims.

BRIEF DESCRIPTION OF THE FIGURE

FIG. 1 illustrates a pneumatic vehicle tire of the invention.

DETAILED DESCRIPTION

The invention is explained in more detail in the following by means of an embodiment with reference to the drawing, with the drawing showing a schematic axially sectional illustration of one half of a centrally symmetrically formed tire in accordance with the invention.

In accordance with the drawing, the tire comprises a two-ply rayon carcass consisting of an inner carcass ply 1 and a radially outer carcass ply 2.

The inner carcass ply 1 is led around the bead 8 and extends at the outer side with this end region 11 over approximately a third of the tire height and is connected to the radially outer carcass ply 2 while forming a region of overlap.

A reinforcing or stiffening strip 3 is provided axially inwardly adjacent to the region of overlap 11 in the region of overlap of the two carcass plies 1, 2, said reinforcing or stiffening strip 3 being made of a textile material and extending up to the direct vicinity of the bead ring (8).

A first rubber reinforcing ply 4 is arranged inside the first carcass ply 1 and between this first carcass ply 1 and an inner rubber layer 7.

A second rubber reinforcing ply 5 is located between the first carcass ply 1 and the second or radially outer carcass ply 2.

The design of the rubber reinforcing plies with respect to their radial height and to their thickness profile over the height, on the one hand, and the mixture used for the rubber reinforcing plies, on the other, are of considerable importance for the running performance of the tire in the deflated state and also for the behavior in normal running.

The two rubber reinforcing plies 4, 5 each have a pronouncedly different radial thickness profile over their height.

The rubber reinforcing plies consist of a rubber mixture of mixes of NR and/or IR and BR as well as carbon black, zinc oxide, stearic acid, aging protection agent, softener, sulfur and accelerator. The reinforcing plies and the bead apexes are preferably manufactured of a rubber mixture consisting of a polymer mix of NR/IR and BR having at least 50 phr of NR/IR, a carbon black content of 50 to 60 phr, 5 to 8 phr of zinc white, 2 phr of stearic acid, 1.5 phr of aging protection agent and at least one phr of vulcanization accelerator and sulfur, 4 to 5 phr of sulfur are preferably used in order to keep the loss properties of the mixture low.

The two rubber reinforcing plies 4, 5 each have a pronouncedly different radial thickness profile over their height.

While the first rubber reinforcing ply tapers to a tip approximately at the height of the bead WI, the radially inner end of the second rubber reinforcing ply 5 is practically formed as a bead apex region 9, i.e. starting from the region of half the tire height, the thickness of this rubber reinforcing ply 5 increases in the direction of the bead and reaches the thickness dimension of this bead 8 at the bead 8.

The rubber reinforcing plies consist of a rubber mixture of mixes of NR and/or IR and BR as well as carbon black, zinc oxide, stearic acid, aging protection agent, softener, sulfur and accelerator. The reinforcing plies and the bead apexes are preferably manufactured of a rubber mixture consisting of a polymer mix of NR/IR and BR having at least 50 phr of NR/IR, a carbon black content of 50 to 60 phr, 5 to 8 phr of zinc white, 2 phr of stearic acid, 1.5 phr of aging protection agent and at least one phr of vulcanization accelerator and sulfur, 4 to 5 phr of sulfur are preferably used in order to keep the loss properties of the mixture low.

The rubber mixture intended for the rubber reinforcing plies and the bead apex or the bead apex region must be cured in a manner such that the rubber reinforcing plies have the following properties in the finished tire:

IRDH hardness greater than or equal to 80 when measured at room temperature; modulus of elasticity (MPa) greater than or equal to 9 MPa and $\tan\delta$ smaller than or equal to 0.03, when measured at 70° C. in each case and by means of "EPLEXOR"; 10 Hz; 10% prestress; 1% DSA (double strain amplitude).

The IRDH measurement (international rubber hardness degree) is carried out in accordance with test method DIN 53519, page 2.

In the drawing representing a preferred embodiment of the invention, measuring points are entered at their exact positions, by means of which thickness values and positions important for the invention can be given.

The tire thickness A2 at the crown center preferably amounts to 16.5±0.8 mm, while the tire thickness C2 at the shoulder amounts to 18.0±1.0 mm at the point shown. The thickness Y of the bead amounts to 14.0±1.5 mm at the point shown, while the bead thickness R1 amounts to 14.0±1.5 mm at the height of the measure R at the point shown.

The measurement of the bead thickness Y is carried out at the height of the measurement W entered in the drawing, with the measurement plane extending as shown in the drawing.

The rubber reinforcing plies 4, 5 have a characteristic thickness profile visible from the drawing over their radial height, said thickness profile being characterized by the thickness values present at the measuring points given in the drawing.

The inner rubber reinforcing ply 4 has a thickness of 5.8±0.8 mm and the outer rubber reinforcing play 5 a thickness of 2.9±0.5 mm at the measurement point D situated approximately at the height of two thirds of the side wall height.

The thickness of the inner rubber reinforcing ply amounts to 6.2±0.5 mm and the thickness of the outer rubber reinforcing ply amounts to 3.1±0.5 mm at the measurement point E at half the side wall height.

At the measurement point Y, the inner rubber reinforcing ply 4 has a thickness of 4.4±0.5 mm in the given plane and the outer rubber reinforcing ply 5, which is simultaneously formed as a bead apex in this region, has a thickness at this point of 8.7±0.5 mm. The thicknesses of the rubber reinforcing plies 4, 5 change continuously between the values given with respect to the defined measurement points.

The value R (bead) given in the drawing amounts to 14.0±1.5 mm, while the bead height WI amounts to 22.0±5.0 mm.

The value A for the inner rubber reinforcing ply 4 is to be given as 33.0±2.5 mm and the value B for the outer rubber reinforcing ply 5 is to be given as 15.0±2.5 mm with respect to the overlap of the rubber reinforcing plies 1, 2 in the radially outer region by the Kevlar (aromatic polyamide) or steel belt plies 10.

The tread end of the outer rubber reinforcing ply 5 is thus disposed at a greater distance from the central plane of the tire than the corresponding end of the inner rubber reinforcing ply 4.

What is claimed is:

1. A pneumatic vehicle tire comprising a multi-ply carcass, which extends between two bead rings having associated bead apexes, a belt arrangement of belt plies provided between the carcass plies and a tread strip and rubber reinforcing plies arranged in the side wall regions, which support the tire when it is deflated, a first rubber reinforcing ply arranged radially within a first carcass ply, and a second rubber reinforcing ply arranged between the first carcass ply and a second carcass ply, wherein the two rubber reinforcing plies extend, starting from the bead apex region and with mutually displaced ends, up to and beneath the edge region of the belt plies the two rubber plies have a different height in the radial direction and pronouncedly different radial thickness over the height of the side wall, and the ends of the radially inner, first carcass ply are led around the respective bead ring, wherein the ends of the first carcass ply are overlappingly connected to the inside of the radially outer second carcass ply extending up to the bead ring; the radially inner end of the second rubber reinforcing ply is formed as a bead apex and the thickened end of this rubber reinforcing ply forms a bead apex region; and a reinforcing or stiffening strip is provided between the turned over end of the first carcass ply and the end of the respective second rubber reinforcing ply forming a bead apex region.

2. A pneumatic vehicle tire in accordance with claim 1, wherein the first rubber reinforcing ply always has a greater radial thickness than the second rubber reinforcing ply, at least radially above the turned over end of the first carcass ply; the tread end of the second rubber reinforcing ply is disposed at a greater distance from the central plane of the tire than the corresponding end of the first rubber reinforcing ply, and both ends are disposed beneath the belt plies.

3. A pneumatic vehicle tire in accordance with claim 1, wherein the carcass plies consist of rayon.

4. A pneumatic vehicle tire in accordance with claim 1, wherein the belt plies consist of aromatic polyamide or steel.

5. A pneumatic vehicle in accordance with claim 1, wherein the complex modulus of elasticity (E*) of the rubber reinforcing plies is the same as or greater than 9 MPa and the $\tan\delta$ is the same as or smaller than 0.03, both measured at 70° C., 10 Hz, 10% prestress and 1% double strain amplitude (DSA).

6. A pneumatic vehicle tire in accordance with claim 5, wherein the hardness IRHD of the rubber reinforcing plies is the same as or greater than 80 when measured at room temperature.

7. A pneumatic vehicle tire in accordance with claim 6, wherein at least the rubber reinforcing plies consist of a rubber mixture which is composed of a polymer mix of natural rubber (NR)/ isoprine rubber(IR) and butadiene rubber (BR) with at least 50 parts by eight per 100 parts by weight of rubber (phr) NR/IR, a carbon black content of 50 to 60 phr, 5 to 8 phr zinc oxide, 2 phr stearic acid, 1.5 phr of ageing protection agent, and also at least 1 phr of vulcanization accelerator and sulfur.

8. A pneumatic vehicle tire in accordance with claim 1, wherein the rubber reinforcing plies which have a continuously changing radial thickness, have in sum total their greatest radial thickness in the region of the half side wall height.

9. A pneumatic vehicle tire in accordance with claim 1, wherein, when measured at approximately two thirds of the side wall height and at the half side wall height, the radial thickness of the inner rubber reinforcing ply amounts to 5.8 and 6.2 mm respectively and the radial thickness of the outer rubber reinforcing ply amounts to 2.9 and 3.1 respectively, with a tolerance of ±0.8 mm applying to the first measured value of 5.8 mm and with a tolerance of ±0.5 mm applying to all other measured values.

10. A pneumatic vehicle tire in accordance with claim 1, wherein, when measured in the region of the maximum radial bead thickness, the radial thickness of the inner rubber reinforcing ply amounts to 4.4 mm, and the radial thickness of the outer rubber reinforcing ply amounts to 8.7 mm, with a tolerance of ±0.5 mm applying to all measured values.

11. A pneumatic vehicle tire in accordance with claim 1, wherein the crown radial thickness (A2) measured at the tire center amounts to 16.5±0.8 mm and the tire radial thickness (C2) measured at the shoulder between the tread and the side walls and in the region of the ends of the rubber reinforcing plies amounts to 18.0±1.0 mm.

* * * * *